United States Patent Office 3,824,126
Patented July 16, 1974

3,824,126
OIL- AND WATER-REPELLENT COMPOSITION CONSISTING OF A FLUORINE CONTAINING POLYMER, SELECTED SALTS AND AN ANTISTATIC AGENT
Atsuo Katsushima, Iwao Hisamoto, Shoshin Fukui, Takahisa Kato, Masayuki Nagai, and Akitoshi Iwatani, Osaka-fu, Japan, assignors to Daikin Kogyo Kabushiki Kaisha, Osaka, Japan
No Drawing. Continuation of abandoned application Ser. No. 816,082, Apr. 14, 1969. This application Aug. 9, 1971, Ser. No. 170,363
Claims priority, application Japan, Apr. 16, 1968, 43/25,671, 43/25,672
Int. Cl. C08f 29/16, 45/56; C09k 3/16
U.S. Cl. 117—139.5 R       12 Claims

ABSTRACT OF THE DISCLOSURE

An oil-repellent and water-repellent composition which consists of an aqueous composition containing a fluorine-containing polymer having a side chain containing perfluoroalkyl group of 3 to 21 carbon atoms in the concentration of 0.1 to 10 weight percent, a water-soluble salt in the range of 0.01 to 10 times the weight of said fluorine-containing polymer and an external permanent antistatic agent in an amount of from 0.1 to 20 times the weight of said fluorine-containing polymer; and a process for imparting oil- and water-repellent properties to fibrous materials, which comprises the step of wetting the fibrous material with said aqueous composition and drying the treated fibrous material.

This application is a continuation of Ser. No. 816,082 filed Apr. 14, 1969, now abandoned.

This invention relates to oil- and water-repellent compositions, and more particularly to the improvement of fluorochemical compositions for imparting oil-and water-repellency to fibrous materials.

It is well known in the art that the surface of fibrous materials treated with a certain kind of fluorine-containing polymers displays oil- and water-repellency. Such fluorine-containing polymers having the above property are those having a side chain containing a perfluoroalkyl group of 3 to 21 carbon atoms. In general, the fibrous materials treated therewith display relatively high water-repellency, but it is not enough for some uses in which higher water-repellency is required.

Further, the fibrous materials treated with the fluorine-containing polymers have an undesirable property of accumulating electrostatic charges developed by friction, which renders them susceptible to soil. To overcome this disadvantage there have been made attempts to use antistatic agents in combination with the fluorine-containing polymers, but the water-repellency of the fibrous materials treated therewith becomes poorer due to the hydrophilic property of the antistatic agents.

Thus it has been considered difficult to produce fibrous materials which are excellent in both water-repellent and oil-repellent properties and also those which have excellent antistatic property as well as excellent water- and oil-repellent properties.

One object of the invention is accordingly to provide improved oil- and water-repellent compositions capable of imparting high order of water-repellency as well as sufficient oil-repellency to fibrous materials treated therewith.

Another object of the invention is to provide improved oil- and water-repellent compositions which make it possible to impart not only excellent oil- and water- repellent properties but also excellent antistatic property to fibrous materials treated therewith.

These and other objects of the invention will be apparent from the following description.

The oil- and water-repellent composition of the invention comprises an aqueous composition containing a fluorine-containing polymer having a side chain containing perfluoroalkyl group of 3 to 21 carbon atoms in a concentration of 0.1 to 10 weight percent and a water-soluble salt in a range of 0.01 to 10 times the weight of said fluorine-containing polymer.

According to the researches of the present inventors it has been unexpectedly found that when fluorine-containing polymer-based oil- and water-repellent compositions contain water-soluble salts the fibrous materials treated therewith display high order of water-repellent property without deterioration of oil-repellent property, and that when such compositions contain external permanent antistatic agents in combination with water-soluble salts the fibrous materials treated therewith display excellent oil- and water-repellent properties and high order of antistatic property. Though the reason why the addition of water-soluble salts results in such distinguished effects has not been ascertained yet, it has first been made clear by us that fluorine-containing polymer-based oil- and water-repellent composition is markedly improved in its effects by the addition of water-soluble salts.

Fluorine-containing polymers used in the invention include those having a side chain containing a perfluoroalkyl group of 3 to 21 carbon atoms, and examples of such polymers are homopolymers or copolymers of the following monomers.

| No. | Formula |
|---|---|
| (1) | $R_f SO_2 NR'OOCCR''=CH_2$ (with R on N) |
| (2) | $R_f(CH_2)_n OOCCR''=CH_2$ |
| (3) | $R_f CONR'OOCCR''=CH_2$ (with R on N) |
| (4) | $R_f CH_2 CHCH_2 OOCCR''=CH_2$ (with OH on middle C) |
| (5) | $R_f COOCH=CH_2$ |
| (6) | $R_f CH=CH(CH_2)_n OOCCR''=CH_2$ | wherein $R_f$ is a perfluoroalkyl of 3 to 21 carbon atoms, R is hydrogen or an alkyl of 1 to 10 carbon atoms, R' is an alkylene of 1 to 10 carbon atoms, R'' is hydorgen or methyl and $n$ is an integer of 1 to 10.

These monomers and polymers thereof are known in the art. For example, polymers of the monomer (1) are disclosed in British Pat. No. 857,689 and No. 904,262, those of the monomer (2) are in U.S. Pat. No. 2,642,416 and No. 3,102,103 and British Pat. No. 1,011,612, those of the monomer (3) are in U.S. Pat. No. 2,764,603, those of the monomer (4) are in British Pat. No. 1,095,900, those of the monomer (5) are in U.S. Pat. No. 2,592,069 and those of the monomer (6) are in British Pat. No. 1,101,-049. Of these polymers, those of the monomer (4) were first synthesized by the present inventors and filed in the United States as Patent Application Ser. No. 515,206, now abandoned, and Ser. No. 695,549 which is continuation-in-part application of the above Ser. No. 515,206.

Of these polymers homopolymers or copolymers of the monomer (4) are most desirable in the invention.

Copolymers of the above fluorine-containing monomers include those prepared by copolymerizing the above monomers with each other and by copolymerizing the above monomer with copolymerizable monomers of other kinds. Examples of the copolymerizable monomers of other kinds are (1) acrylic acid, methacrylic acid or such esters thereof as methyl, ethyl, propyl, butyl, isobutyl, 2-ethylhexyl, hexyl, decyl, lauryl, stearyl, etc.; (2) vinyl esters of aliphatic acids, such as vinyl acetate, vinyl propionate, vinyl caprylate, vinyl laurate, vinyl stearate, etc.; (3) styrene or styrene compounds, such as α-methylstyrene, p-methylstyrene, etc.; (4) halogenated vinyl or vinylidene compounds such as vinyl fluoride, vinyl chloride, vinyl bromide, vinylidene fluoride, vinylidene chloride, etc.; (5) allyl esters of aliphatic acids, such as allyl heptanoate, allyl caproate, allyl caprylate, etc.; (6) vinylalkyl ketones, such as, vinylmethyl ketone, vinylethyl ketone, etc.; (7) acrylamides, such as N-methylol acrylamide, N-methylol methacrylamide, glycidil acrylate, glycidil methacrylate, etc.; and (8) diene compounds, such as butdaiene, 2,3-dichloro-1,3-butadiene, isoprene, etc. Of these comonomers acrylic acid, methacrylic acid and esters thereof are most desirable. The copolymers used in the invention contain the fluorine-containing monomers in at least 25 weight percent, preferably in more than 50 weight percent.

Polymerization of the fluorine-containing monomers may be carried out by the methods known to the art, for example, by bulk polymerization, emulsion polymerization and suspension polymerization, using either heat, free-radical catalysts, ultraviolet light or ionizing radiations. Of these methods, the most desirable one is an emulsion polymerization, as stable aqueous polymer emulsion can be obtained by such a method. The emulsion polymerization may be carried out, for example, by polymerizing fluorine-containing monomers in an aqueous medium containing a dispersant and radical initiator. As the dispersant various cationic or anionic surfactants may be used. Examples thereof are octadecyltrimethyl ammonium acetate, dodecyltrimethyl ammonium bromide, tetradodecyltrimethyl ammonium chloride, (dodecylmethyl-benzyl)-trimethyl ammonium chloride, (dodecyl-benzyl)-trimethyl ammonium bromide, penta-decafluorooctyl ammonium chloride and like cationic surfactants, and sodium alkyl- ($C_{12}$–$C_{18}$)benzene sulfonate, sodium alkyl naphthalene sulfonate, sodium oleate, sodium alkyl($C_{16}$–$C_{18}$)acetate, ammonium perfluoroalkanoate and like anionic surfactants.

In the invention it is essential to use at least one water-soluble salt in combination with the fluorine-containing polymer, whereby excellent water-repellency as well as oil-repellency can be imparted to fibrous materials treated therewith. As the water-soluble salts may be used any salts having water-solubility, which include, for example, ammonium salts, amine salts and metal salts of various inorganic and organic acids. Examples of the acids are hydrochloric acid, nitric acid, carbonic acid, sulfuric acid, phosphoric acid, boric acid, acetic acid, tartaric acid and the like. Examples of metal salts are those salts of metals belonging to Groups I to VIII, preferably Groups I to IV, of Periodic Table, including double salts and complex salts thereof. Examples thereof are water-soluble salts of lithium, sodium, potassium, magnesium, calcium, zinc, cadmium, aluminium, selenium, tin, lead, vanadium, antimony, chromium, molybdenum, manganese, etc. Representatives of the preferable water-soluble salts are ammonium chloride, ammonium dihydrogenphosphate, ammonium tetrafluoroborate, ammonium thiocyanate and like ammonium salts; lithium chloride, sodium chloride, potassium chloride, potassium fluoride, sodium iodide, potassium selenate, sodium perchlorate, potassium nitrate, sodium acetate, magnesium chloride, magnesium sulfate, calcium bromide, zinc chloride, zinc fluorosilicate, potassium alum, aluminium acetate, cerium chloride, manganese nitrate, cobalt chloride and like metal salts; and triethylamine hydrochloric acid salt, ethylenediamine hydrochloric acid salt and like amine salts. Of these salts particularly desirable are ammonium salts of hydrochloric acid, nitric acid or phosphoric acid, most desirable being ammonium chloride and ammonium dihydrophosphate.

The aqueous oil- and water-repellent compsition of the invention may be prepared easily by dissolving water-soluble salts in aqueous polymer emulsion containing fluoride-containing polymers obtained by emulsion polymerization of the fluorine-containing monomers afore-mentioned. The composition may contain the fluorine-containing polymer in the range of 0.1 to 10 weight percent, preferably 0.3 to 5 weight percent, based on the total weight of the composition. The water-soluble salts should be contained in the composition in the range of 0.01 to 10 times, preferably 0.5 to 5 times, the weight of the polymer in the composition. Lesser amount of the salts results in no or poor improvement of water-repellency, while larger amount adversely affects the stability of the resultant composition without any better effects.

According to the present compositions containing fluorine-containing polymers and water-soluble salts, not only excellent oil-repellency but also excellent water-repellency as high as 90–100 marks in terms of spray rating can be imparted to the fibrous materials treated therewith.

Further, for the present composition external permanent antistatic agents may be added thereto without imparing water-repellency of the fibrous materials treated therewith. The external permanent antistatic agents for fibrous materials are known in the art and include cationic, anionic and nonionic agents, though cationic and anionic agents are preferred. Examples of cationic antistatic agents are (1) quaternary ammonium salts derived from alkyl amines, acylamides or acryloxyalkylamines, and (2) quaternary ammonium salts derived from homo- or co-polymers containing nitrogen atom, such as, for example, polyaminoalkyl acrylates, polyamino-alkyl acrylamides, aminoalkyl vinyl ether polymers, vinylamine polymers, polyoxy ethylene polyamine condensation polymers, triazine-formaldehyde polymers, etc. Examples of anionic antistatic agents are (1) higher carboxylic acid derivatives; (2) sulfonated compounds such as sulfated-esters, sulfated-acids, sulfated-amides, sulfated alcohols, sulfated olefines, etc.; (3) sulfonated compounds, such as sulfonated oils, alkane sulfonates, alkyl aromatic sulfonates, sulfonated polyesters, etc.; (4) phosphated compounds, such as phosphoric esters, etc.; and (5) phosphonated compounds such as alkane phosphonates, etc.

The external permanent antistatic agents as above may be added to the present aqueous composition containing fluorine-containing polymer and water-soluble salt in the range of 0.1 to 20 times, preferably 0.5 to 10 times, the weight of the fluorine-containing polymer in the composition.

Fibrous materials to be treated with the present composition are yarn, textile, knit, felt, nonwoven fabric and paper made of at least one fiber. Such fibers include cellulose, silk, wool and like natural fibers; cellulose acetate, cellulose propionate and like artificial fibers, and polyamide, polyester, polyacrylonitrile, polyvinylalcohol and like synthetic fibers.

The fibrous materials are wetted with the present composition by coating, dipping, spraying, padding and like conventional methods, so as to attach the fluorine containing polymer to the fibrous materials in the amount of 0.1 to 5 weight percent in terms of dry weight. The wetted fibrous materials are then dried, and cured as required. After curing the fibrous materials may be washed with neutral detergents as required.

For better understanding of the invention Examples are given below, in which all parts and percentages are by weight, and oil-repellency, water-repellency and electrostatic voltage are measured by the following methods. ("AATCC" indicates the American Association of Textile Chemists and Colourists.)

Oil-repellency: AATCC 118–1966 T
Water-repellency: AATCC 22–1952
Electrostatic voltage: Electrostatic voltage was measured by using Hayker's static machine described in Am. Dyestuff Rep., 164 (1951).

EXAMPLE 1

(a) Preparation of the homopolymer of

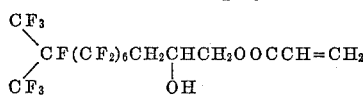

In a 300-ml. 4-necked flask equipped with a reflux condenser, thermometer, dropping funnel and agitator were placed 40 grams of $(CF_3)_2CF(CF_2)_6CH_2CH(OH)CH_2OOCCH=CH_2$ 138 grams of deoxidated water, 20 grams of acetone and 6 grams of 62:38 weight ratio mixture of dimethyloctadecyl amine and glacial acetic acid, and thoroughly mixed by stirring in nitrogen stream. Then the mixture was gradually heated to 40–55° C., and to the mixture was added dropwise 0.1 gram of azobisisobutyroamidine hydrochloric acid salt dissolved in 20 grams of deoxidated water. After the addition the reaction system was heated with stirring at 58–62° C. for 4 hours, whereby stable polymer emulsion, milk-white in color, having a polymer concentration of 17 percent was obtained.

(b) Preparation of oil- and water-repellent composition and treatment of fibrous materials:

To the polymer emulsion obtained as above (a) were added one weight percent aqueous solution of sodium chloride and water in amounts shown in Table 1 below to produce 7 kinds of oil- and water-repellent compositions.

Woven fabric consisting of 65 percent polyester fiber and 35 percent cotton was passed through the respective aqueous compositions and squeezed to 80 percent impregnation, based on the weight of the each fabric treated. Then the fabric was dried at 80° C. for 20 minutes and heat-treated at 160° C. for 3 minutes.

The oil-repellency and water-repellency of each fabric thus treated are shown in Table 1 below.

TABLE 1

| Number | Polymer emulsion (parts) | 1% NaCl solution (parts) | Water (parts) | Oil-repellency | Water-repellency |
|---|---|---|---|---|---|
| 1 | 5 | 0 | 95 | 7 | 70 |
| 2 | 5 | 0.5 | 94.5 | 7 | 90 |
| 3 | 5 | 2 | 93 | 7 | 100 |
| 4 | 5 | 20 | 75 | 7 | 100 |
| 5 | 5 | 80 | 15 | 7 | 100 |
| 6 | 0.5 | 2 | 97.5 | 7 | 100 |
| 7 | 0.5 | 20 | 79.5 | 7 | 100 |

EXAMPLE 2

To 5 parts of the polymer emulsion obtained in Example 1-(a) were added 20 parts of 1 percent aqueous solution of each water-soluble salt shown in Table 2 below and 75 parts of water.

The same woven fabric as ued in Example 1-(b) was treated with each composition in the same manner as in Example 1-(b) with the following results shown in Table 2 below.

TABLE 2

| Number | Water-soluble salts | Oil-repellency | Water-repellency |
|---|---|---|---|
| 8 | Potassium chloride | 7 | 100 |
| 9 | Sodium iodide | 7 | 100 |
| 10 | Cerium chloride | 7 | 100 |
| 11 | Ammonium sulfate | 7 | 100 |
| 12 | Ammonium tetrafluoroborate | 7 | 100 |
| 13 | Sodium potassium tartarate | 7 | 100 |

EXAMPLE 3

To 1 part of the polymer emulsion obtained in Example 1-(a) were added 1 part of 0.5 percent aqueous solution of aluminium sulfate and 98 parts of water to produce oil- and water-repellent composition of the invention.

A woven fabric of polyacrylonitrile fiber was passed through the above composition and squeezed to 100 percent impregnation. The the fabric was dried at 80° C. for 20 minutes and heat-treated at 120° C. for 1 minute.

The fabric thus treated showed the following oil- and water-repellency:

Oil-repellency _____ 7
Water-repellency _____ 100

For comparison the same fabric was treated in the same manner as above except that the fabric was treated with the composition prepared by diluting 1 part of the polymer emulsion obtained in Example 1-(a) with 99 parts of water without adding aluminium sulfate. The oil- and water-repellency of the resultant fabric were as follows:

Oil-repellency _____ 7
Water-repellency _____ 70

EXAMPLE 4

To one part of the polymer emulsion obtained in Example 1-(a) was added 99 parts of 1.5 percent aqueous solution of ammonium chloride to produce oil- and water-repellent composition of the invention.

The same fabric as used in Example 1-(b) was treated in the same manner as in Example 1-(b). The oil-repellency of the fabric thus treated was 7 and water-repellency thereof was 100.

The fabric thus treated was imersed in tetrachloroethylene with stirring at 30° C. for 3 hours and dried at room temperature. The oil-repellency of the resultant fabric was 6 and water-repellency thereof was 90, showing excellent durability for dry-cleaning.

For comparison the same fabric as in this Example was treated in the same manner except that it was treated with the composition prepared by diluting 1 part of the polymer emulsion obtained in Example 1-(a) with 99 parts of water without adding ammonium chloride. Thus treated fabric showed oil-repellency of 7 and water-repellency of 80.

EXAMPLE 5

(a) Preparation of the copolymer of $(CF_3)_2CF(CF_2)_6CH_2-CH(OH)CH_2OOCCH=CH_2$ and 2-ethylhexyl methacrylate:

In a 300-ml. 4-necked flask equipped with a reflux condenser, thermometer, dropping funnel and agitator were placed 36 grams of $(CF_3)_2CF(CF_2)_6CH_2CH(OH)CH_2OOCCH=CH_2$, 0.34 gram of N-methylolacrylamide, 31.5 grams of 2-ethylhexyl methacrylate, 45 grams of deoxidated water, 7 grams of acetone and 6.4 grams of a 62 to 38 weight ratio mixture of dimethyloctadecyl amine and glacial acetic acid and thoroughly mixed with stirring in nitrogen stream. Then the mixture was gradually heated to 40–55° C. and to the mixture was added dropwise 0.06 gram of azobisisobutyronitrile amidine hydrochloric acid salt dissolved in 5 grams of deoxidated water. After the addition the reaction system was heated with stirring at 58–62° C. for 3 hours, whereby stable polymer emulsion, milk-white in colour having a polymer concentration of 50 percent was obtained.

(b) Preparation of oil- and water-repellent composition and treatment of fibrous materials:

To 70 parts of the polymer emulsion obtained as above (a) were added 27 parts of 50 percent aqueous solution of zinc nitrate and 3 parts of dimethyloctadecylamine acetic acid salt and the resultant mixture was diluted with water to produce 2500 parts of aqueous oil- and water-repellent composition.

Woven fabric of polyamide fiber was treated with the above composition in the same manner as in Example 1-(b). The resultant fabric showed oil-repellency of 7 and water-repellency of 100.

For comparison the same fabric was treated in the same manner as above with the composition prepared in the same manner as above except that zinc nitrate and dimethyloctadecylamine acetic acid salt were not added. The resultant fabric showed oil-repellency of 7 and water-repellency of 80.

EXAMPLE 6

To 70 parts of the polymer emulsion prepared in Example 5–(a) was added 30 parts of 1.5 percent aqueous solution of ammonium dihydrogen phosphate. To 4 parts of the resultant mixture were added 12 parts of "Sumitex Resin T–5" (trademark, triazine resin), 2 parts of "Sumitex Accelerator ACX" (trademark, curing agent for triazine resin) and 85 parts of water.

Cotton broad-cloth was treated with the above composition as in Example 1–(b), and the resultant fabric showed oil-repellency of 7 and water-repellency of 100.

EXAMPLE 7

To 1.5 parts of the polymer emulsion obtained in Example 5–(a) were added 0.5 part of external permanent antistatic agents shown in Table 3 below, the predetermined amount of ammonium chloride and the necessary amount of water for producing 100 parts of composition.

Woven fabric of polyester fiber was immersed in the composition thus obtained for 3 minutes and squeezed to 100 percent impregnation. Then the fabric was dried at 80° C. for 20 minutes and heat-treated at 150° C. for 3 minutes.

The oil-repellency, water-repellency and electrostatic voltage of the fabric thus treated are shown in Table 3 below.

TABLE 3

| No. | Antistatic agents | Amount of NH₄Cl (parts) | Oil-repellency | Water-repellency | Electrostatic voltage (v.) |
|---|---|---|---|---|---|
| 14 | Parmax AW-2 | 0.2 | 7 | 100 | 20 |
| 15 | do | 0 | 7 | 70 | 20 |
| 16 | Nicepole EN | 0.2 | 7 | 100 | 30 |
| 17 | do | 0 | 7 | 70 | 50 |
| 18 | Sumistat E | 0.2 | 7 | 100 | 20 |
| 19 | do | 0 | 7 | 70 | 40 |
| 20 | Perlect UC-1 | 0.2 | 7 | 100 | 40 |
| 21 | do | 0 | 7 | 70 | 70 |
| 22 | Parlex A | 0.2 | 7 | 90 | 120 |
| 23 | do | 0 | 7 | 70 | 210 |
| 24 | Aston 900 EP | 0.2 | 7 | 90 | 220 |
| 25 | do | 0 | 7 | 70 | 300 |
| 26 | Takenon AS-100 | 0.2 | 7 | 90 | 50 |
| 27 | do | 0 | 7 | 70 | 50 |
| 28 | Not used (blank) | 0.2 | 7 | 100 | 1,200 |
| 29 | do | 0 | 7 | 80 | 2,100 |

NOTE.—Parmax AW-2=trademark, quaternary ammonium salt; Nicepole EN=trademark, quaternary ammonium salt; Sumistat E=trademark, quaternary ammonium salt; Perlect UC–1=trademark, quaternary ammonium salt, Parlex A=trademark, polyamine derivative, Aston 900 P=trademark, polyamine derivative; Takenon AS–100=trademark, Nonionic anti-static agent.

EXAMPLE 8

To 1 part of the polymer emulsion obtained in Example 5–(a) were added the predetermined amount of "Parmax AW–2" (trademark, same as referred to in Example 7) dissolved in 20 parts of water, the predetermined amount of ammonium chloride dissolved in 20 parts of water and the necessary amount of water for producing 100 parts of composition.

Woven fabric of polyester fiber was treated with the above composition in the same manner as in Example 7, and the oil-repellency, water-repellency and electrostatic voltage of the fabric thus treated are shown in Table 4 below.

TABLE 4

| Number | Amount of NH₄Cl (parts) | Amount of "Parmax AW-2" (parts) | Oil-repellency | Water-repellency | Electrostatic voltage (v.) |
|---|---|---|---|---|---|
| 30 | 0.005 | 0.025 | 7 | 100 | 350 |
| 31 | 0.005 | 0.05 | 7 | 100 | 20 |
| 32 | 0.025 | 0.05 | 7 | 100 | 15 |
| 33 | 0.25 | 0.25 | 7 | 100 | 20 |
| 34 | 0.25 | 0.25 | 7 | 100 | 13 |
| 35 | 0.50 | 0.25 | 7 | 100 | 15 |
| 36 | 5.0 | 10.0 | 7 | 100 | 11 |

EXAMPLE 9

To 3.75 parts of the polymer emulsion obtained in Example 5–(a) were added 0.5 parts of "Parmax AW–2" (trademark, same as referred to in Example 7), 0.2 part of water soluble salts shown in Table 5 below and the necessary amount of water for producing 100 parts of composition.

Woven fabric of polyester fiber was treated with the composition thus obtained in the same manner as in Example 7. The oil- and water-repellency and electrostatic voltage of the resultant fabric thus treated are shown in Table 5 below.

TABLE 5

| No. | Water-soluble salt | Oil-repellency | Water-repellency | Electrostatic voltage (v.) |
|---|---|---|---|---|
| 37 | NH₄Cl | 7 | 100 | 20 |
| 38 | (NH₄)₂HPO₄ | 7 | 100 | 20 |
| 39 | CH₃COONa | 7 | 100 | 20 |
| 40 | KBr | 7 | 100 | 20 |
| 41 | MgSO₄ | 7 | 100 | 20 |
| 42 | ZnI₂ | 7 | 90 | 20 |
| 43 | Al(NO₃)₂ | 7 | 100 | 30 |
| 44 | CeCl₃ | 7 | 100 | 20 |
| 45 | SnCl₄ | 7 | 90 | 20 |
| 46 | CrCl₂ | 7 | 90 | 20 |
| 47 | MnSO₄ | 7 | 90 | 20 |
| 48 | FeCl₂ | 7 | 100 | 30 |
| 49 | (NH₄)₂Fe(SO₄)₂·6H₂O | 7 | 100 | 30 |
| 50 | (C₂H₅)₃N·HCl | 7 | 100 | 20 |
| 51 | H₂NCH₂CH₂NH₂·2HCl | 7 | 90 | 30 |
| 52 | (HOC₂H₄NH₂)·HCL | 7 | 90 | 20 |
| 53 | Sodium potassium tartarate | 7 | 100 | 20 |
| 54 | Not used (blank) | 7 | 70 | 30 |

EXAMPLE 10

(a) Preparation of the homopolymer of $C_8F_{17}CH_2CH_2OOCC(CH_3)=CH_2$:

In the same flask as in Example 5 were placed 50 grams of $C_8F_{17}CH_2CH_2OOCC(CH_3)=CH_2$, 5 grams of trimethyloctadecyl ammonium bromide, 1 gram of azodiisobutylamidine hydrochloric acid salt, 25 grams of acetone and 150 grams of deoxidated water, and heated at 58–62° C. in nitrogen stream for 6 hours.

The polymer emulsion thus obtained had a polymer concentration of 20 percent.

(b) Preparation of oil- and water-repellent composition and treatment of fibrous material:

To 2 parts of the polymer emulsion obtained as above (a) were added the predetermined amount of "Parmax AW–2" (trademark, same as referred to in Example 7) dissolved in 20 parts of water, the predetermined amount of ammonium dihydrogenphosphate dissolved in 20 parts of water and the necessary amount of water for producing 100 parts of composition.

Woven fabric of polyester fiber was treated with the composition thus obtained in the same manner as in Example 7. The fabric thus treated had the oil-repellency, water-repellency and electrostatic voltage shown in Table 6 below.

TABLE 6

| Number | Amount of $NH_4H_2PO_4$ (parts) | Amount of "Parmax AW-2" (parts) | Oil-repellency | Water-repellency | Electrostatic voltage (v.) |
|---|---|---|---|---|---|
| 55 | 0 | 0 | 7 | 70 | 2,510 |
| 56 | 0.5 | 0 | 7 | 100 | 250 |
| 57 | 0 | 1 | 7 | 70 | 250 |
| 58 | 0.5 | 1 | 7 | 100 | 25 |

EXAMPLE 11

(a) Preparation of the copolymer of $$C_8F_{17}SO_2N(C_2H_5)CH_2CH_2OOCC(CH_3)=CH_2$$

and butadiene:

In a 100-ml. pressure ampoule were placed 31.5 grams of deoxidated water, 4.7 grams of aceton, 1.25 grams of $C_8F_{17}SO_2NH(CH_2)_3N(CH_3)_2 \cdot HCl$, 0.05 gram of potassium persulfate, 0.125 gram of dodecylmercaptane, 0.125 gram of n-octylmercaptane and 12.5 grams of butadiene, and the ampoule was sealed. The ampoule was heated with shaking at 50° C. for 26 hours to polymerize butadiene. After this reaction, 12.5 grams of $$C_8F_{17}SO_2N(C_2H_5)CH_2CH_2OOCC(CH_3)=CH_2$$

and 8.8 grams of acetone were further added to the reaction mixture and heated at 50° C. for 16 hours for further polymerization. Thus, polymer emulsion milk-white in color having a polymer concentration of 29 percent was obtained.

(b) Preparation of oil- and water-repellent composition and treatment of fibrous material:

To 2.5 parts of the polymer emulsion were added the predetermined amount of "Amogen K" (trademark, antistatic agent represented by $R^a_2R^bN^+CH_2COO^-$, wherein $R^a$ is higher alkyl group and $R^b$ is lower alkyl group) dissolved in 50 parts of water and predetermined amount of sodium chloride dissolved in 20 parts of water and then to the mixture was further added water in the amount necessary for making 100 parts of composition. Woven fabric consisting of 65 percent polyester and 35 percent cotton was treated in the same manner as in Example 7. The oil- and water-repellency and electrostatic voltage of the fabric thus treated are shown in Table 7 below.

TABLE 7

| Number | Amount of NaCl (parts) | Amount of "Amogen K" (parts) | Oil-repellency | Water-repellency | Electrostatic voltage (v.) |
|---|---|---|---|---|---|
| 59 | 0 | 0 | 7 | 80 | 1,000 |
| 60 | 0.5 | 0 | 7 | 100 | 250 |
| 61 | 0 | 5 | 7 | 70 | 10 |
| 62 | 0.5 | 5 | 7 | 100 | 7 |

EXAMPLE 12

(a) Preparation of the homopolymer of $$C_7F_{15}CH_2OOCCH=CH_2:$$

In the same flask as in Example 5–(a) were placed 75 grams of $C_7F_{15}CH_2OOCCH=CH_2$, 2.3 grams of sodium laurylsulfate, 0.4 gram of potassium persulfate and 135 grams of deoxidated water, and the mixture was heated at 50° C. for 3 days to polymerize the fluorine-containing monomer.

The polymer emulsion milk-white in color having a polymer concentration of 33 percent was obtained.

(b) Preparation of oil- and water-repellent composition and treatment of fibrous material:

To 1.5 parts of the polymer emulsion thus obtained were added the predetermined amount of "Electol #200" (trademark, antistatic agent of

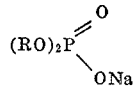

dissolved in 30 parts of water and the predetermined amount of ammonium dihydrogen phosphate dissolved in 10 parts of water, and then to the mixture was added water in the amount necessary for producing 100 parts of composition.

Woven fabric of polyamide fiber was immersed in the composition and squeezed to 80 percent impregnation. Then the fabric was dried at 80° C. and heat-treated at 140° C. for 10 minutes. The oil- and water-repellency and electrostatic voltage of the fabric thus treated are shown in Table 8 below.

TABLE 8

| Number | Amount of $NH_4H_2PO_4$ (parts) | Amount of "Electrol #200 (parts) | Oil-repellency | Water-repellency | Electrostatic voltage (v.) |
|---|---|---|---|---|---|
| 63 | 0 | 0 | 7 | 80 | 2,300 |
| 64 | 0.5 | 0 | 7 | 100 | 1,300 |
| 65 | 0 | 2.5 | 7 | 70 | 300 |
| 66 | 0.5 | 2.5 | 7 | 100 | 60 |

EXAMPLE 13

To 2 parts of the polymer emulsion obtained in Example 11–(a) were added the predetermined amount of "Aston" (trademark, cationic antistatic agent of water soluble polymer containing amino group) dissolved in 30 parts of water and the predetermined amount of potassium chloride dissolved in 20 parts of water, and then to the mixture was added water in the amount necessary for producing 100 parts of composition.

Woven fabric of polyacrylonitrile was treated with the composition thus obtained in the same manner as in Example 7. The oil- and water-repellency and electrostatic voltage of the fabric thus treated are shown in Table 9 below.

TABLE 9

| Number | Amount of KCl (parts) | Amount of "Aston" (parts) | Oil-repellency | Water-repellency | Electrostatic voltage (v.) |
|---|---|---|---|---|---|
| 67 | 0 | 0 | 7 | 80 | 2,200 |
| 68 | 0.3 | 0 | 7 | 100 | 250 |
| 69 | 0 | 2 | 7 | 70 | 200 |
| 70 | 0.3 | 2 | 7 | 100 | 20 |

It is claimed:
1. An oil- and water-repellent composition consisting of:

water;
from 0.1 to 10 percent by weight, based on the weight of the composition, of an oil- and water-repellent fluorine-containing polymer having a side chain containing a perfluoroalkyl group of from 3 to 21 carbon atoms and being homopolymers or copolymers of fluorine-containing monomers selected from the group consisting of:

$$R_fSO_2NR'OOCCR''=CH_2$$

$$R_f(CH_2)_nOOCCR''=CH_2$$

$$R_fCONR'OOCCR''=CH_2$$

$$R_fCH_2CHCH_2OOCCR''=CH_2$$
           $|$
          $OH$ $$R_fCOOCH=CH_2$$

$$R_fCH=CH(CH_2)_nOOCCR''=CH_2$$

wherein $R_f$ is a perfluoroalkyl of 3 to 21 carbon atoms, R is hydrogen or an alkyl of 1 to 10 carbon atoms, R' is an alkylene of 1 to 10 carbon atoms, R'' is hydrogen or methyl and n is an integer of 1 to 10, said copolymers containing at least 25 weight percent of said fluorine containing monomers and up to 75 percent by weight of a copolymerizable monomer;

a water soluble salt in an amount of from 0.01 to 10 times the weight of said fluorine-containing polymer, said salt being selected from the group consisting of sodium chloride, potassium chloride, ammonium chloride, ammonium dihydrogenphosphate, ammonium tetrafluoroborate, ammonium thiocyanate, ammonium sulfate, lithium chloride, potassium bromide, potassium fluoride, sodium iodide, sodium potassium tartrate, potassium selenate, sodium perchlorate, potassium nitrate, sodium acetate, magnesium chloride, magnesium sulfate, calcium bromide, zinc iodide, ferrous chloride, zinc chloride, zinc fluorosilicate, ferrous ammonium sulfate, potassium alum, aluminum acetate, aluminum nitrate, cerium chloride, manganese nitrate, chromium chloride, cobalt chloride, tin chloride, manganese sulfate, triethylamine hydrochloric acid salt, ethylenediamine hydrochloric acid salt, $(HOC_2H_4NH_2) \cdot HCl$, and ammonium salts of acids selected from the group consisting of nitric, carbonic, phosphoric, boric, acetic, and tartaric acid;

and an external permanent antistatic agent in an amount of from 0.1 to 20 times the weight of the fluorine-containing polymer.

2. A composition according to claim 1 wherein said monomer is

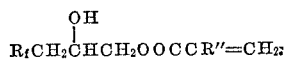

3. A composition according to claim 1 wherein said water soluble salt is an ammonium salt of an acid selected from the group consisting of hydrochloric, nitric and phosphoric acid.

4. A composition according to claim 3 wherein said salt is selected from the group consisting of ammonium chloride and ammonium dihydrogenphosphate.

5. A composition according to claim 1 wherein said antistatic agent is selected from the group consisting of cationic antistatic agents selected from the group consisting of quaternary ammonium salt derivatives of alkyl amines, acylamides, acryloxyalkylamines, polyaminoalkyl acrylates, polyamino-alkyl acrylamides, aminoalkyl vinyl ether polymers, vinylamine polymers, polyoxyethylene polyamine condensation polymers, and triazine-formaldehyde polymers, anionic antistatic agents selected from the group consisting of higher carboxylic acid derivatives, sulfated, esters, sulfated acids, sulfated amides, sulfated alcohols, sulfated olefins, sulfonated oils, alkane sulfonates, alkyl aromatic sulfonates, sulfonated polyesters, phosphoric esters, and alkane phosphonates.

6. A composition according to claim 1 wherein said polymer includes up to 50 percent by weight of a copolymerizable monomer selected from the group consisting of acrylic acid, methacrylic acid and methyl, ethyl, propyl, butyl, isobutyl, 2-ethylhexyl, hexyl, decyl, lauryl, and stearyl, esters thereof, vinyl acetate, vinyl propionate, vinyl caprylate, vinyl laurate, vinyl stearate, a-methylstyrene, p-methylstyrene, vinyl fluoride, vinyl chloride, vinyl bromide, vinylidene, fluoride, vinylidene chloride, allyl heptanoate, allyl caproate, allyl caprylate, vinylmethyl ketone, vinylethyl ketone, N-methylol acrylamide, N-methylol methacrylamide, glycidil acrylate, glycidil methacrylate, butadiene, 2,3-dichloro-1,3-butadiene, and isoprene.

7. A composition according to claim 1 wherein said polymer is present in an amount of 0.3 to 5 weight percent, said water soluble salt is present in an amount of 0.5 to 5 times the weight of said polymer, and the antistatic agent is present in an amount of from 0.5 to 10 times the weight of said polymer.

8. An oil- and water-repellent composition according to claim 1 wherein said polymer is present in an amount of 0.3 to 5 weight percent and is selected from the group consisting of homopolymers of monomers having the formula

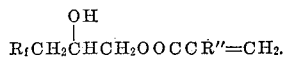

and copolymers thereof with up to 50 percent by weight of a monomer selected from the group consisting of acrylic acid, methacrylic acid, and methyl, ethyl, propyl, butyl, isobutyl 2-ethylhexyl, hexyl, decyl, lauryl, and esters thereof; wherein said salt is present in an amount of 0.5 to 5 times the weight of said polymer and is an ammonium salt of an acid selected from the group consisting of hydrochloric, nitric and phosphoric acid; and wherein said antistatic agent is present in an amount of 0.5 to 10 times the weight of said polymer and is selected from the group consisting of cationic and anionic antistatic agents.

9. A composition according to claim 2 wherein said antistatic agent is selected from the group consisting of quaternary ammonium salt derivatives of alkyl amines, acylamides, acryloxyalkylamines, polyaminoalkyl acrylates, polyamino-alkyl acrylamides, aminoalkyl vinyl ether polymers, vinylamine polymers, polyoxyethylene polyamine condensation polymers, and triazine-formaldehyde polymers, anionic antistatic agents selected from the group consisting of higher carboxylic acid derivatives, sulfated esters, sulfated acids, sulfated amides, sulfated alcohols, sulfated olefines, sulfonated oils, alkane sulfonates, alkyl aromatic sulfonates, sulfonated polyesters, phosphoric esters, and alkane phosphonates.

10. A method of imparting oil- and water-repellent properties of fibrous materials which comprises the steps of wetting a fibrous material with the aqueous compositions of claim 1 and drying the treated fibrous material.

11. A method of imparting oil- and water-repellent properties of fibrous materials which comprises the steps of wetting a fibrous material with the aqueous compositions of claim 7 and drying the treated fibrous material.

12. A method of imparting oil- and water-repellent properties to fibrous materials which comprises the steps of wetting a fibrous material with the aqueous compositions of claim 8 and drying the treated fibrous material.

References Cited

UNITED STATES PATENTS

| | | | |
|---|---|---|---|
| 3,546,187 | 12/1970 | Tandy, Jr. | 260—29.6 F X |
| 3,486,911 | 12/1969 | Goldstein | 106—2 |
| 3,462,296 | 8/1969 | Raynolds et al. | 260—29.6 F X |
| 3,438,925 | 4/1969 | Raynolds et al. | 260—29.6 F X |
| 3,378,609 | 4/1968 | Fasick et al. | 260—29.6 F X |
| 3,514,420 | 5/1970 | Katsushima et al. | 260—29.6 F |
| 3,532,659 | 10/1970 | Hager et al. | 260—29.6 F |
| 3,491,169 | 1/1970 | Raynolds et al. | 260—29.6 F X |

FOREIGN PATENTS

| | | | |
|---|---|---|---|
| 1,095,900 | 12/1967 | Great Britain | 260—29.6 F |

ROBERT F. WHITE, Primary Examiner

J. B. LOWE, Assistant Examiner

U.S. Cl. X.R.

117—135.5, 139.5 A, 139.5 CQ; 260—296 F